(No Model.)
G. D. BULMER.
TONGS.
No. 529,516. Patented Nov. 20, 1894.
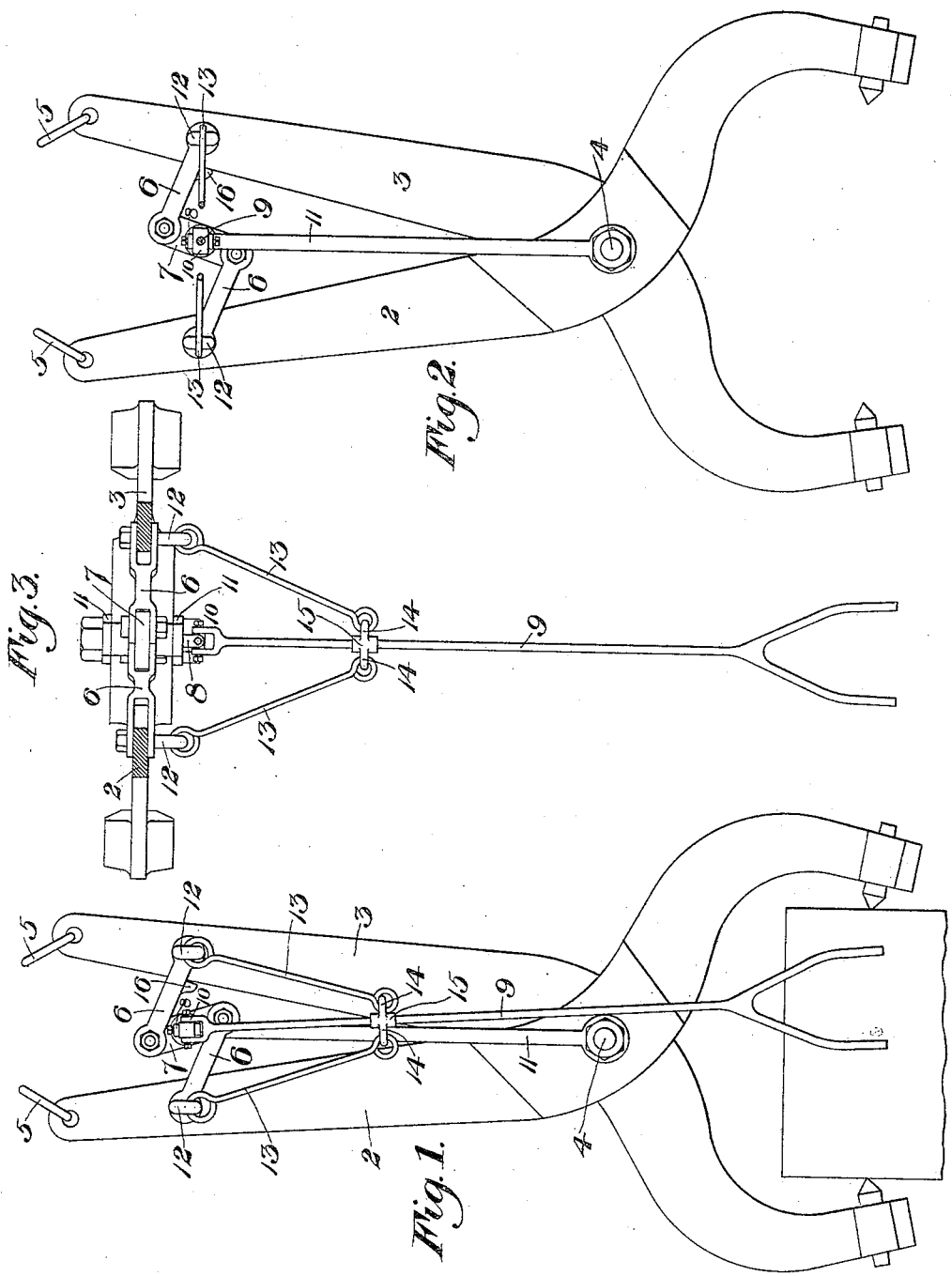
WITNESSES
INVENTOR
George D. Bulmer

UNITED STATES PATENT OFFICE.

GEORGE D. BULMER, OF DUQUESNE, PENNSYLVANIA.

TONGS.

SPECIFICATION forming part of Letters Patent No. 529,516, dated November 20, 1894.

Application filed August 8, 1894. Serial No. 519,737. (No model.)

*To all whom it may concern:*

Be it known that I, GEORGE D. BULMER, of Duquesne, in the county of Allegheny and State of Pennsylvania, have invented a new and useful Improvement in Tongs, of which the following is a full, clear, and exact description, reference being had to the accompanying drawings, forming a part of this specification, in which—

Figure 1 is a side elevation of my improved tongs in closed position. Fig. 2 is a similar view showing the tongs opened, the operating rod being broken away; and Fig. 3 is a top plan view.

My invention relates to the tongs employed in handling ingots and metal bars, and is designed to improve their construction and facilitate the opening, closing and operating of the same.

In the drawings, 2 and 3 represent the crossed tong levers pivoted together upon the pin 4 and adapted to be connected to the jib or trolley by the chains 5. These levers are provided with pivoted rods 6, which at their inner ends are pivotally connected to a link 7, to a pin 8 in the intermediate portion of which link an operating rod 9 is attached by means of a universal joint connection 10. The link is supported in place by rods 11, which at their lower ends take about the pin 4, and at their upper ends are pivoted to the pin 8 which is rigid with the link. The outer pivot pins of the connecting rods 6 in the levers terminate on one side in eyes 12, which are engaged by links 13 connected to eyes 14 upon a collar 15 sliding upon the operating rod. One of the rods 6 is provided with a stop 16 to prevent the swinging of the rod beyond a certain point, so that the rods can never come into line with each other.

The operation is apparent, since by the operating rod and links 13 the tongs may be turned into the proper position, and then by rotating the rod slightly, the connecting rods push open the levers when the tongs are lowered upon the ingot, and releasing the rod the weight of the tongs closes them upon the ingot, the link swinging back to the position of Fig. 1.

The advantages of the invention will be apparent to those skilled in the art. The tongs are simple, of few parts and not liable to get out of order. The operating handle is attached to the tongs and always ready for use, and ordinary tongs may be easily fitted up in accordance with my invention.

A disk may replace the link, and many other variations may be made without departure from my invention, since

What I claim is—

1. The combination with tong levers, of a link, rods pivotally connecting the levers and the link, and a rigid handle connected to the central portion of the link and arranged to rotate the link when the handle is turned; substantially as described.

2. The combination with tong-levers, of a link, rods pivotally connecting the levers and the link, a rigid handle connected to the central portion of the link and arranged to rotate the link when the handle is turned, and links connecting the levers to a slide upon the handle; substantially as described.

3. The combination with tong-levers, of a link, rods pivotally connecting the levers and the link, and an operating handle having a universal joint connection with the link; substantially as described.

4. The combination with tong-levers, of a link, rods pivotally connected to the pivot pin of the tong levers, and supporting the link, and a handle arranged to turn the link and operate the tongs; substantially as described.

5. The combination with tong-levers, of a link, rods pivotally connecting the levers and link, an operating rod arranged to turn the link, and links connecting the levers to a slide upon the operating rod; substantially as described.

In testimony whereof I have hereunto set my hand.

GEORGE D. BULMER.

Witnesses:
 W. B. CORWIN,
 H. M. CORWIN.